(12) United States Patent
Hoegh et al.

(10) Patent No.: US 8,127,718 B2
(45) Date of Patent: Mar. 6, 2012

(54) KENNEL WITH AUTOMATICALLY OPENING DOOR

(76) Inventors: Thomas Barry Hoegh, Edina, MN (US); Timothy Harold Grafe, Edina, MN (US)

( * ) Notice: Subject to any disclaimer, the term of this patent is extended or adjusted under 35 U.S.C. 154(b) by 260 days.

(21) Appl. No.: 11/740,972

(22) Filed: Apr. 27, 2007

(65) Prior Publication Data

US 2008/0264349 A1    Oct. 30, 2008

Related U.S. Application Data

(60) Provisional application No. 60/745,910, filed on Apr. 28, 2006.

(51) Int. Cl.
*A01K 15/02* (2006.01)

(52) U.S. Cl. ......... 119/481; 119/712; 119/719; 119/905

(58) Field of Classification Search .................. 119/481, 119/712, 859, 719, 721, 720; 340/573.3; 49/169; 43/58, 60, 61
See application file for complete search history.

(56) References Cited

U.S. PATENT DOCUMENTS

| | | | |
|---|---|---|---|
| 3,897,753 A | | 8/1975 | Lee et al. |
| 4,205,628 A | * | 6/1980 | Null ............... 119/700 |
| 4,216,743 A | * | 8/1980 | Cohen ............ 119/484 |
| 4,224,899 A | | 9/1980 | Cruchelow et al. |
| 4,418,493 A | * | 12/1983 | Jordan ............... 43/67 |
| 4,497,133 A | * | 2/1985 | Blenkinsop ........ 49/31 |
| 4,513,686 A | * | 4/1985 | Demko ............ 119/427 |
| 4,823,010 A | * | 4/1989 | Kornbrekke et al. ...... 250/341.7 |
| 4,908,484 A | * | 3/1990 | Gunoff ............ 200/331 |
| 5,061,918 A | | 10/1991 | Hunter |
| 5,177,900 A | * | 1/1993 | Solowiej ........... 49/363 |
| 5,183,008 A | * | 2/1993 | Carrano ........... 119/840 |
| 5,370,080 A | * | 12/1994 | Koepp ............ 119/51.11 |
| 5,469,807 A | * | 11/1995 | Kosmaczeska ...... 119/484 |
| 5,579,719 A | * | 12/1996 | Hoff et al. ........ 119/51.02 |
| 5,651,331 A | * | 7/1997 | Cleri, Jr. ......... 119/484 |
| 5,992,096 A | * | 11/1999 | De La Cerda et al. ..... 49/169 |
| 6,135,055 A | * | 10/2000 | Pratt ............. 119/51.02 |
| 6,141,911 A | * | 11/2000 | Reid ............. 49/394 |
| 6,148,766 A | * | 11/2000 | van der Lely ...... 119/14.08 |
| 6,152,081 A | | 11/2000 | Baker |
| 6,297,739 B1 | * | 10/2001 | Small ............ 340/573.3 |
| 6,341,582 B1 | * | 1/2002 | Gompper et al. ..... 119/840 |
| 6,560,926 B1 | * | 5/2003 | Gillett ............ 49/169 |
| 6,651,592 B2 | | 11/2003 | Maddox et al. |
| 6,666,167 B1 | * | 12/2003 | Carlson .......... 119/54 |

(Continued)

*Primary Examiner* — Yvonne R. Abbott
(74) *Attorney, Agent, or Firm* — Pauly, Devries Smith & Deffner, L.L.C.

(57) ABSTRACT

The general goal of the present invention is to prevent damage to property resulting from the animal's separation anxiety which typically is a consequence of the pet owner's departure while minimizing the period of time the dog is confined. The most obvious objective is to restrain the animal until it calms down. A similar approach would be to reward the animal with a treat once it has calmed down.

We have invented a device that incorporates an automatically releasing door of the kennel. For instance, the owner of a canine would place the dog in a kennel prior to leaving his or her residence. The owner would initiate a timer on the kennel, and the kennel door would automatically open after a predetermined amount of time, for instance 30 minutes, or some other amount of time that was sufficient to calm the canine's emotions. After the door is automatically open, the canine would be free to exit the kennel for exercise, to access water and/or food, or otherwise explore the dwelling or its surroundings.

18 Claims, 3 Drawing Sheets

U.S. PATENT DOCUMENTS

| | | | |
|---|---|---|---|
| 6,691,463 B1 * | 2/2004 | Richmond | 49/360 |
| 6,710,714 B2 * | 3/2004 | Conway | 340/573.3 |
| 6,745,788 B1 | 6/2004 | Brown | |
| 6,904,868 B2 * | 6/2005 | Block et al. | 119/51.12 |
| 6,939,894 B2 | 9/2005 | Takahashi et al. | |
| 6,944,990 B2 * | 9/2005 | Noyes | 49/169 |
| 6,959,511 B2 * | 11/2005 | Johnson et al. | 49/169 |
| 6,966,147 B2 * | 11/2005 | Solowiej | 49/169 |
| 7,328,671 B2 * | 2/2008 | Kates | 119/720 |
| 7,334,537 B2 * | 2/2008 | Van Den Berg et al. | 119/14.02 |
| 2003/0221631 A1 * | 12/2003 | Yarbrough | 119/484 |
| 2003/0230124 A1 * | 12/2003 | Johnson et al. | 70/267 |
| 2004/0194714 A1 * | 10/2004 | Lee | 119/54 |
| 2007/0181069 A1 * | 8/2007 | Jack | 119/61.1 |
| 2008/0072843 A1 * | 3/2008 | Malacarne et al. | 119/719 |
| 2008/0156274 A1 * | 7/2008 | Andrade et al. | 119/484 |
| 2008/0264349 A1 * | 10/2008 | Hoegh et al. | 119/718 |
| 2009/0307961 A1 * | 12/2009 | Walter et al. | 43/61 |

* cited by examiner

KENNEL WITH AUTOMATICALLY OPENING DOOR

RELATED APPLICATION

This application claims priority from co-pending U.S. Provisional Patent Application No. 60/745,910, by Thomas Hoegh, filed on Apr. 28, 2006.

BACKGROUND

Field of the Invention

This invention relates to improved kennels for pets, especially dogs.

Background

It is well known that canine pets experience separation anxiety when their owners leave, and as a result of that anxiety, exhibit behavior problems such as digging, chewing, scratching, barking or eliminating indoors.

Canine experts recommend a variety of methods for alleviating a dog's separation anxiety. Some of these methods include feeding the dog before leaving, exercising the dog before leaving, leaving the radio on, giving the dog a toy to play with, administering anti-anxiety medication or placing the dog in a large kennel. Confining the dog to a kennel is an effective way to prevent damage to property but many pet owners view that this is not an ideal situation, because the canine is confined, it may not have access to food and/or water, it cannot exercise and cannot relieve itself.

Experts contend that canines have little sense of the passage of time. As a result, once the initial period of anxiety has passed, the canine is generally calm and less prone to causing physical destruction of its surroundings.

It is the object of the present invention to develop a product that overcomes the problems inherent with kennel confinement, or in cases where a kennel is not currently used, to introduce a kennel to pet owners who are experiencing destructive behavior caused by their dog's separation anxiety.

While there are a variety of kennel designs disclosed in the prior art, there are no designs that are suitable for relieving the anxiety of dog while also providing the dog with the possibility of mobility.

U.S. Pat. No. 6,939,894 to Takahashi describes a pharmaceutical approach to reduce a dog's barking. However, this solution does not prevent damage, is costly, and has unwanted side effects.

U.S. Pat. No. 6,651,592, Maddox et al, describes a system for rewarding an animal's behavior and automatically dispensing treats. However, this invention does not address the issue of separation anxiety.

U.S. Pat. No. 6,745,788 to Brown describes a novel tent enclosure for an animal with an automatically closing door, but does not address the issue of separation anxiety, nor does it teach an automatically opening door.

U.S. Pat. No. 4,224,899 to Cruchelow et al describes an enclosure for an animal that is a transitional housing between a residence and the outdoors. However, this device does not address the issue of separation anxiety.

U.S. Pat. No. 6,691,463 to Richmond describes an improved kennel door, but does not teach automatic opening or other means to address a canine's anxiety.

U.S. Pat. No. 3,897,753 to Lee et al describes a system for allowing an animal's selective access to and restriction from certain areas for activities such as feeding. However, this device does not teach automatically opening kennel doors based on some event, such as the passage of time or behavior of a dog.

U.S. Pat. No. 5,061,918 to Hunter describes a system of bio-feedback for detecting unwanted animal behavior and creating a disturbing noise to reduce the animal's behavior. While this invention is directed at improving animal behavior, it can cause pain and does not teach enclosing or restraining an animal.

U.S. Pat. No. 6,152,081 to Baker teaches a novel, open top kennel to control an animal's behavior in the kennel. However, this does not teach a device to allow a dog to exit a kennel.

Several researchers have investigated separation anxiety in pets. One researchers observations are given as follows.

"Preliminary signs of separation anxiety in dogs, such as panting and pacing, often begin as owners prepare to leave. More overt (and destructive) behaviors usually begin minutes after the owner's departure. "The first 30 minutes are the most important," notes Dr. Nicholas Dodman, director of the Behavior Clinic at Tufts University School of Veterinary Medicine. If a dog calmly passes that threshold, it will generally remain calm."—From "Your Dog", a monthly newsletter from Tufts School of Veterinary Medicine, 203 Harrison Ave., Boston, Mass.

It is understood that while canine separation anxiety is a well-known phenomenon this type of device may well apply to other animals.

SUMMARY

The general goal of the present invention is to prevent damage to property resulting from the animal's separation anxiety which typically is a consequence of the pet owner's departure while minimizing the period of time the dog is confined. The most obvious objective is to restrain the animal until it calms down. A similar approach would be to reward the animal with a treat once it has calmed down.

We have invented a device that incorporates an automatically releasing door of the kennel. For instance, the owner of a canine would place the dog in a kennel prior to leaving his or her residence. The owner would initiate a timer on the kennel, and the kennel door would automatically open after a pre-determined amount of time, for instance 30 minutes, or some other amount of time that was sufficient to calm the canine's emotions. After the door is automatically open, the canine would be free to exit the kennel for exercise, to access water and/or food, or otherwise explore the dwelling or its surroundings.

The present invention as described relates specifically to domesticated pets which in this specification are referred to as animals.

DRAWINGS

Figure 1:
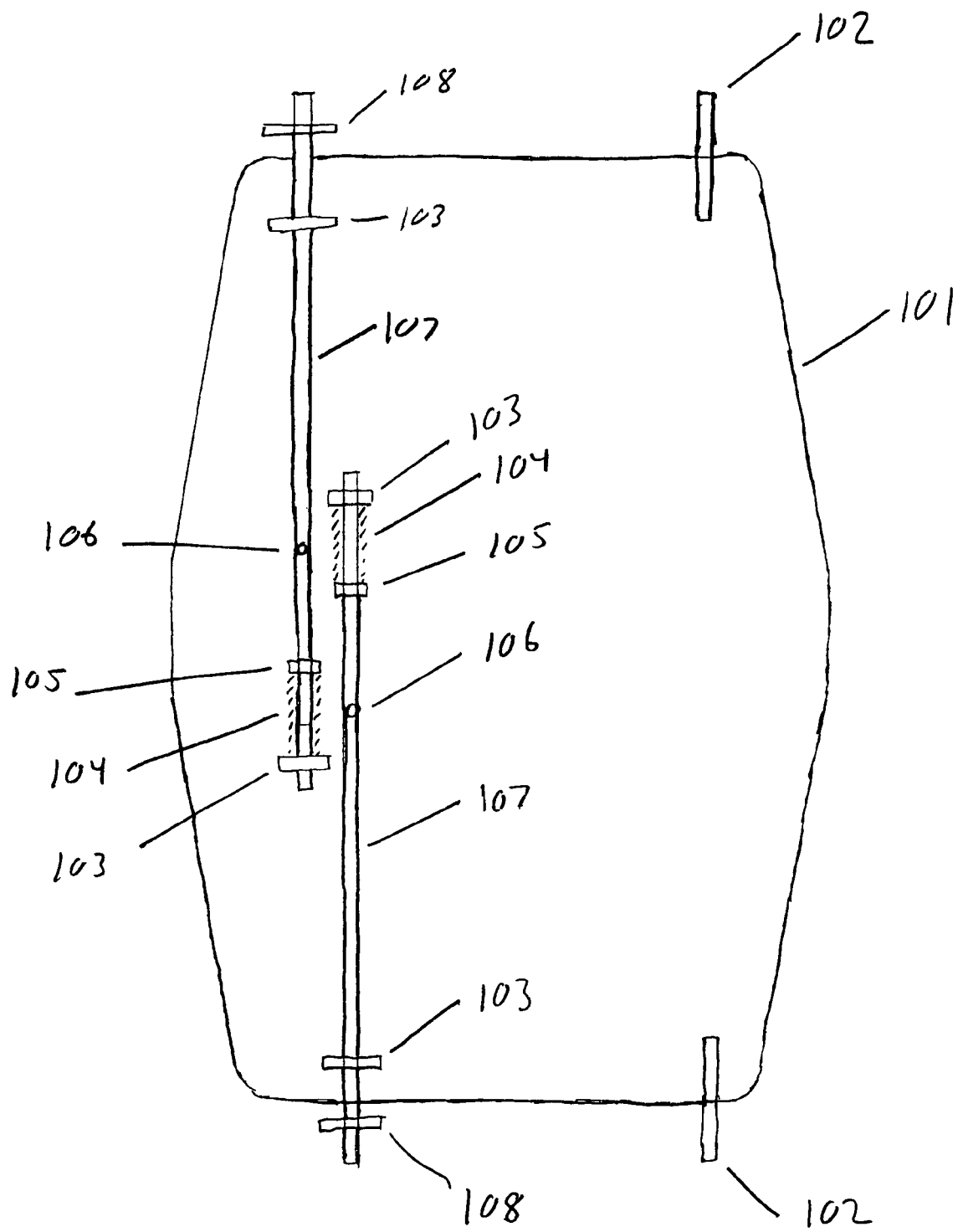
FIG. 1 is a drawing which represents the hinge and latching features found on commonly available kennel gates.

FIG. 1 is a drawing of a gate found on commonly available kennels. The gate 101 is attached to the frame (not shown) of the kennel by upper and lower rods 102 which function as hinge points. An upper rod 107 and a lower rod 107 retain the gate in the closed position when they are engaged in frame receptacles 108. Each rod is spring-loaded with a spring 104. Each spring acts against a stop 105 which is fixed to rod 107 and a second stop 103 which is fixed to the gate 101. The purpose of spring-loading each rod is to keep it firmly engaged with frame receptacle 108 to prevent accidental release of the kenneled animal. Each rod 107 has a handle 106 to allow manual release of the rod 107 from its receptacle 108.

Figure 2:
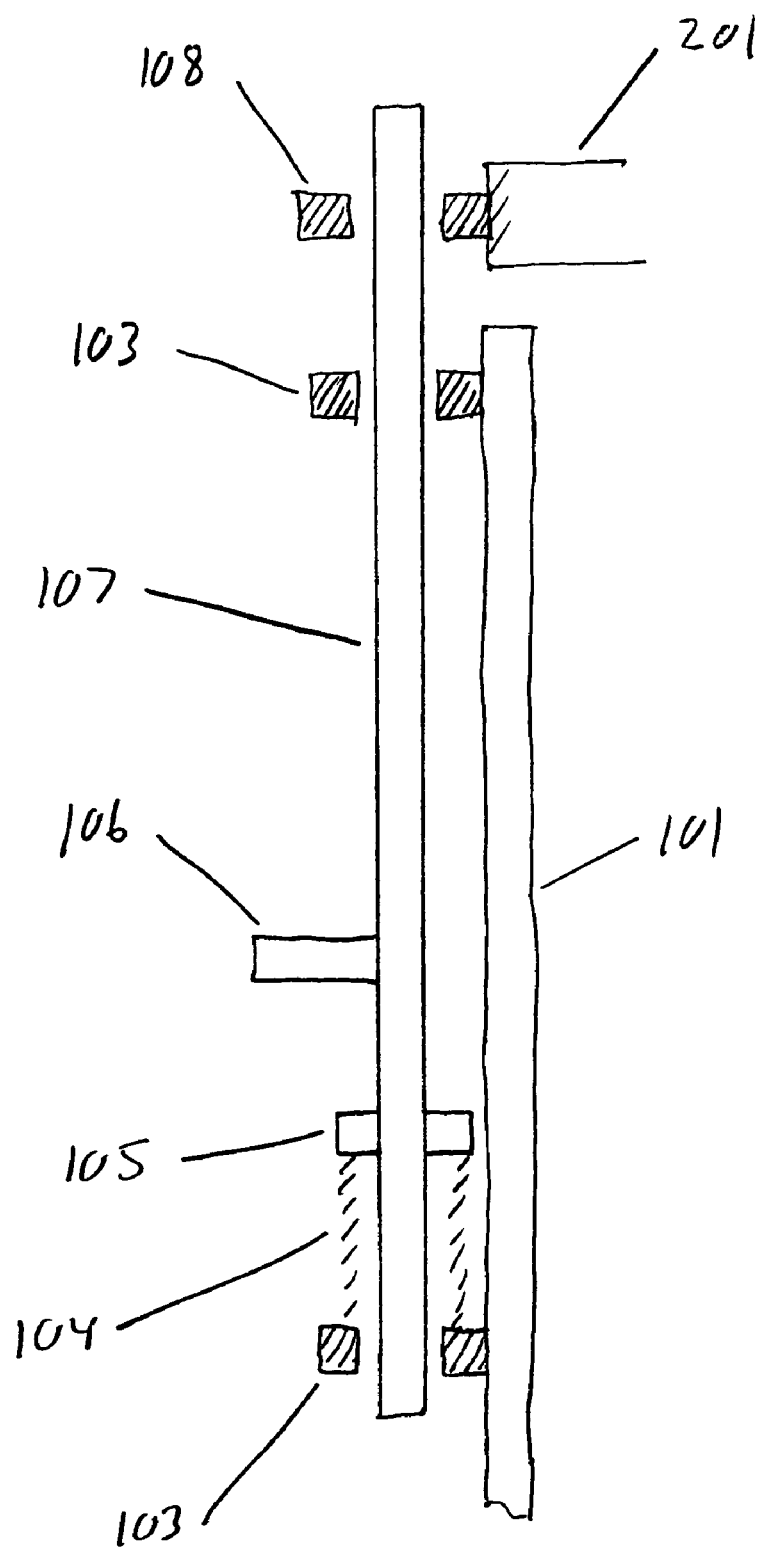
FIG. 2 is a cutaway view of the mechanism which retains the kennel gate in a closed and latched position.

FIG. 2 is a cutaway view of the mechanism which retains the kennel gate in a closed position. The frame receptacle 108 is attached to the kennel frame 201 in a position such that when rod 107 is engaged, the gate is prevented from opening. The rod 107 is free to slide though guiding elements 103 which are fixed to the gate. Spring 104 retains rod 107 in an engaged position by applying force against stop 105 which is fixed to the rod and a second stop 103 which is fixed to the gate.

Figure 3:
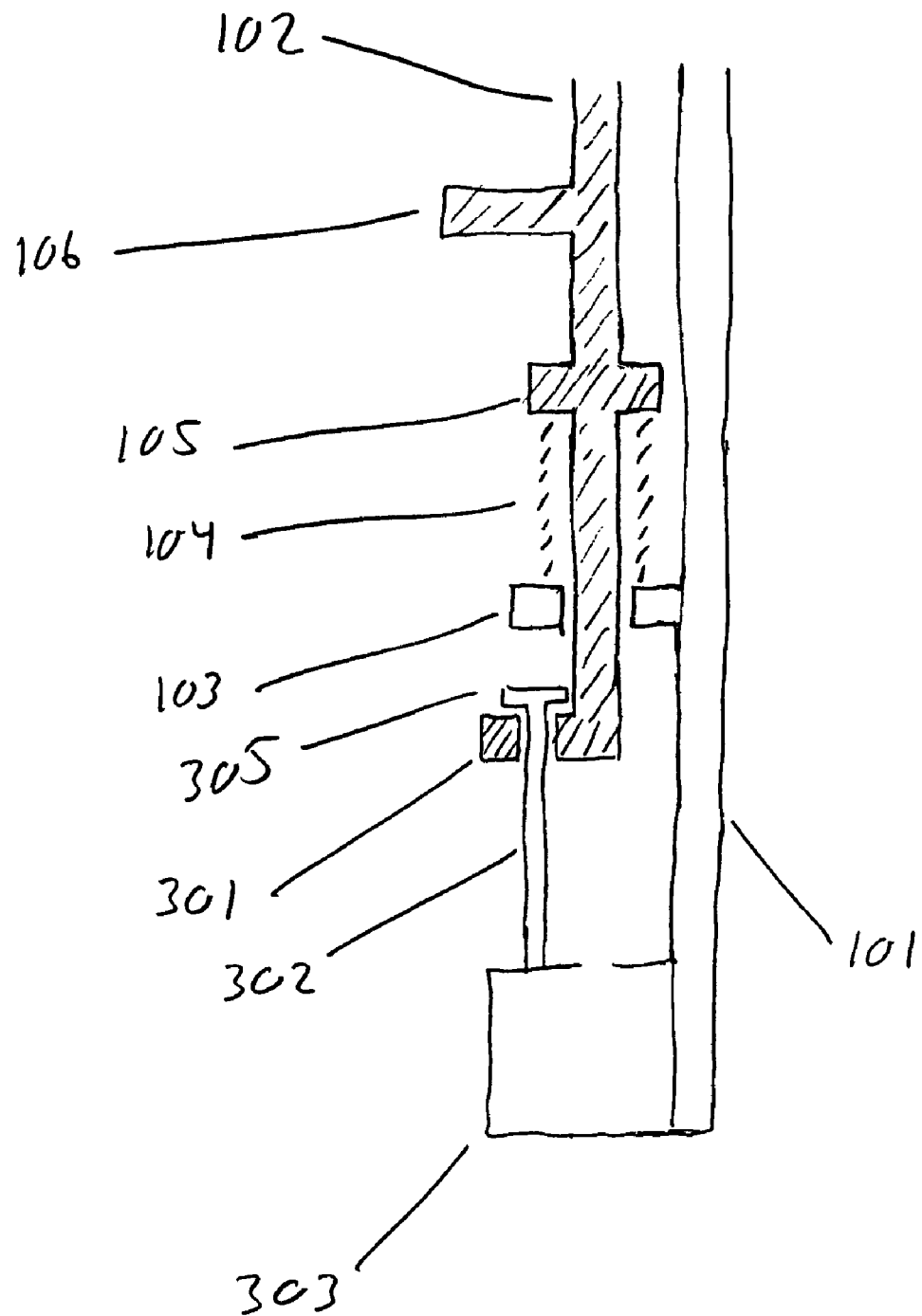
FIG. 3 is a drawing of the preferred embodiment of the actuator which can be used by the control device to release the gate latch.

FIG. 3 is a drawing of the preferred embodiment of the actuator which can be used by a control device to release the gate latch. The end of rod 102 has been modified to include a loop 301. A shaft 302 extends through loop 301. The cross-section of shaft 302 is small enough and shaft 302 is long enough to allow loop 301 to slide down far enough to release rod 102 from frame receptacle 108. Frame receptacle 108 is not shown in this figure. The shaft head 305 of shaft 302 is large enough to prevent passing through loop 301. Shaft 302 is attached to actuator 303. Actuator 303 is fixed to the gate 101.

DETAILED DESCRIPTION

Time-Release Kennel Door

A typical pet kennel has a gate with a latch. A timer could be used to trigger an actuator which would release the latch after a certain period of time. In this manner, a pet's owner could put their pet into the kennel, latch the door, set the timer and leave. Ideally, the timer would release the door's latch after the pet's anxiety had subsided. The functionality of the apparatus could be enhanced by designing the timer to not only unlatch but also open the door to insure the animal was aware that it was no longer confined. The actuator would ideally be designed to allow either manual release of the gate's latch or automatic release by the actuator.

Movement-Dependent Kennel Door

A kennel typically has a door with a latch. The kennel could be outfitted with a device which monitors movement of the animal within. Once the animal's separation anxiety subsides and the animal settles down, the device could release the latch to the kennel door. The activity-monitoring device could be accomplished in a variety of ways. An infrared motion detector could be used to monitor the animal's movement. Load cells could be attached to one or more of the kennel's feet. Once the animal stops moving around, the signal from any such sensor could be used to trigger release of the kennel door latch.

Noise-Dependent Kennel Door

A kennel typically has a door with a latch. The device could be outfitted with a device which monitors noise such as barking in the case of a dog. Once the barking stops the device would release the kennel door latch. The device could also be designed to release the latch only if the animal has stopped barking for a certain period of time.

Tamper-Dependent Kennel Door

A kennel typically has a door with a latch. It is not atypical that the confined animal tampers with the door in an attempt to escape confinement. The door could be fitted with a device to sense such tampering. As long as the animal is tampering with the kennel door the device will not release the kennel door latch. After the animal stops tampering with the kennel door the device will release the kennel door latch. The device could be designed to release the latch only if the animal has stopped tampering with the kennel door for a certain period of time.

One way to design such a tamper-sensing device would be to take advantage of the slight movement which is typical of any door, but especially a kennel door. An electrical switch could be mounted on the frame of the kennel such that movement of the latched door changes the position of the switch. The movement of the switch would provide a signal indicating tampering with the kennel door.

Time-Release Leash

A leash is built with a mechanism at the distal end. The primary function of the mechanism is to retain a clip which can be used to attach to an animals collar. The mechanism would be constructed to contain a timer which releases the clip from the mechanism after a given period of time. The pet owner would simply tie up the animal with the Time-Release Leash in a location where the pet cannot do significant damage, set the timer and leave. Ideally, the timer would be set to release after the animal's anxiety has subsided. The clip would be released from the mechanism.

Activity-Dependent Leash

A leash is built with a mechanism at the distal end. The primary function of the mechanism is to retain a clip which can be used to attach to an animals collar. The mechanism would be constructed to contain a timer which releases the clip from the mechanism after a given period of time has elapsed where the animal has not pulled on the leash. The mechanism could be designed such that if the animal strains against the leash it would reset. In this manner it could be assured that the animal would have to be relatively calm for a given period of time prior to being released. The pet owner would simply tie up the animal with the Activity-Dependent Leash in a location where the pet cannot do significant damage, set the timer and leave.

Gradual-Release Leash

It could well be the case that an animal which is suddenly released from being restrained would be prone to cause damage to the owner's property. For this reason it may be desirable to have a means of restraint which is gradually released. For example, a leash could be designed such that it allows the pet a greater range of motion over a given period of time. After being allowed a greater range of motion the pet could be released from the leash entirely as described in the sections above titled "Time-Release Leash" and "Activity-Dependent Leash." The gradual release leash itself could be activity-regulated.

Multiple Animals in Restraints

It may be necessary to restrain multiple animals at the same time. In this case it may be desirable to not allow any animals to be released until all the animals have calmed down. In the same respect, it may be undesirable to release multiple animals simultaneously. In this event, it would be desirable to release one or at least fewer than all the animals, then allow a certain period of time to pass before releasing more animals. Designing multiple release devices to work in coordination would allow multiple animals to be released and allowed freedom of movement while avoiding the problems associated with separation anxiety.

Rewards and Other Issues

A similar concept to the Gradual-Release Leash is to provide the animal with a treat or some other type of positive reinforcement prior to, coincident with or following release from confinement. In the case of the Movement-Dependent Kennel Door a treat could be dispensed to the animal prior to the release of the kennel door. This would not only reward the animal for calming down but also distract the animal while the door latch is being released, thereby preventing an emotional burst of activity on being released from the kennel.

In one embodiment the invention restrains movement of a canine using a restraint and an automatic release of restraint. Another embodiment uses a controller which determines the time of said automatic release of said means of restraint. In another embodiment the time of automatic release is based on the behavior of the restrained canine. In another embodiment the behavior is the restrained canine's movement which may include but is not limited to pacing, breathing, chewing, scratching or tail wagging. In another embodiment the behavior is a sound made by the restrained canine such as breathing, barking, mewing, scratching, gnawing, growling or whining.

In another embodiment the time of automatic release is based on a biological parameter of the restrained canine. In another embodiment biological parameter may be heart rate, respiratory rate or respiratory minute volume. In another embodiment the time of automatic release is based on passage of time. In another embodiment time is determined by a mechanical timer. In yet another embodiment passage of time is determined by a timer.

In other embodiments the time of automatic release is based on an external signal. In another embodiment said event is an external signal such as sound, temperature, light, vibration or humidity. In yet another embodiment the external signal is a signal from a phone, computer or other communication device. In yet another embodiment the external signal is the sound or a signal from a fire alarm or smoke detector.

In yet another embodiment the time of automatic release is based on a combination of two or more of the following: passage of time, the behavior of said restrained canine, a biological parameter of the restrained canine and an external signal. In another embodiment the restraint may be an enclosure, control of an access point or a freedom-limiting device. In another embodiment the enclosure may be a kennel, an electronic fence, a fenced-in area, a room in a home, a garage, or a doghouse. In another embodiment the access point may be a kennel gate, a pet door, a gate or a door to a room. In still another embodiment the freedom-limiting device may be a leash, collar, halter, muzzle, shock-collar or leg-restraint.

Another embodiment of the invention is a kennel for restraining a canine comprising an enclosure, a gate, a means for securing said gate to prevent liberation of said canine, and a means of automatically releasing said means of securing said gate. In another embodiment of the invention the kennel comprises a controller which determines the time of automatic release of said means of securing said gate. In another embodiment, the kennel the means of securing said gate is a latch. In another embodiment, the controller time of automatic release is based on passage of time. In another embodiment, the controller passage of time is determined by a mechanical or electrical timer.

We claim:

1. An apparatus for restraining a canine in order to reduce separation anxiety, the apparatus comprising:
    an enclosure for limiting the movement of a canine, the enclosure comprising a door over an opening in the enclosure, the opening configured for both ingress and egress of a canine from the enclosure;
    a locking mechanism configured to manually lock the door after ingress of a canine into the enclosure,
    a timer capable of producing a signal; and
    a device configured to automatically unlock the door upon receipt of a signal from the timer, thereby permitting egress from the enclosure by the canine, said egress proceeding through the same opening by which ingress occurred.

2. The apparatus of claim 1, wherein the timer comprises a mechanical timer.

3. The apparatus of claim 1, wherein the timer comprises an electrical timer.

4. The apparatus of claim 1, further comprising a behavior monitor configured to provide an alternative signal to the device configured to automatically unlock the door, thereby permitting egress from the enclosure by the canine in the absence of a signal from a timer.

5. The apparatus of claim 1, further comprising a sensor apparatus configured to provide an alternative signal to the device, the alternative signal to the device configured to remotely unlock the door, thereby permitting egress from the enclosure by the canine in the absence of a signal from a timer.

6. The apparatus of claim 5, wherein the sensor apparatus comprises a radio receiver.

7. An apparatus for restraining a canine in order to reduce separation anxiety, the apparatus comprising:
    an enclosure for limiting the movement of a canine, the enclosure comprising a door over an opening in the enclosure, the opening configured for both ingress and egress of a canine from the enclosure;
    a timer capable of producing a signal, wherein the timer capable of producing a signal; and
    a device configured to receive said signal and release the canine in response to the signal;
    wherein the canine enters and exits the enclosure by the same door.

8. The apparatus of claim 7, wherein the timer comprises a mechanical timer.

9. The apparatus of claim 7, wherein the timer comprises an electrical timer.

10. The apparatus of claim 7, further comprising a behavior monitor configured to provide an alternative signal to the device configured to automatically unlock the door, thereby permitting egress from the enclosure by the canine in the absence of a signal from a timer.

11. The apparatus of claim 7, further comprising a sensor apparatus configured to provide an alternative signal, the alternative signal to the device configured to remotely unlock the door, thereby permitting egress from the enclosure by the canine in the absence of a signal from a timer.

12. The apparatus of claim 11, wherein the sensor apparatus comprises a radio receiver.

13. A method for restraining an animal having separation anxiety, the method comprising:
    placing the animal in an enclosure including:
        a) a timer capable of producing a signal, and
        b) a device configured receive said signal and release the animal from the enclosure in response to the signal;
    setting the timer to a duration of time, wherein the duration of time is sufficient to calm the animal's emotions while in the enclosure; and
    automatically opening the enclosure to release the animal;
    wherein the enclosure is automatically opened by the timer sending a signal to the device after the duration of time has elapsed.

14. The method of claim 13, wherein the timer release comprises a mechanical timer.

15. The method of claim 13, wherein the timer comprises an electrical timer.

16. The method of claim 13, further comprising a behavior monitor configured to provide an alternative signal to the device configured to automatically unlock the door, thereby permitting egress from the enclosure by the canine in the absence of a signal from a timer.

17. The method of claim 13, further comprising a sensor apparatus configured to provide an alternative signal to the device, the alternative signal to the device configured to automatically unlock the door, thereby permitting egress from the enclosure by the canine in the absence of a signal from a timer.

18. The method of claim 17, wherein the sensor apparatus comprises a radio receiver.

* * * * *